(12) United States Patent
Venugopal et al.

(10) Patent No.: US 11,599,455 B2
(45) Date of Patent: Mar. 7, 2023

(54) NATURAL LANGUAGE PROCESSING (NLP)-BASED CROSS FORMAT PRE-COMPILER FOR TEST AUTOMATION

(71) Applicant: Bank of America Corporation, Charlotte, NC (US)

(72) Inventors: Dilip Venugopal, Stallings, NC (US); Ajay Kumar Pulipati, Hyderabad (IN); Vishal Murugesan, Tiruppur (IN)

(73) Assignee: Bank of America Corporation, Charlotte, NC (US)

( * ) Notice: Subject to any disclaimer, the term of this patent is extended or adjusted under 35 U.S.C. 154(b) by 13 days.

(21) Appl. No.: 17/370,608

(22) Filed: Jul. 8, 2021

(65) Prior Publication Data
US 2023/0008037 A1    Jan. 12, 2023

(51) Int. Cl.
| | |
|---|---|
| G06F 11/36 | (2006.01) |
| G06F 21/60 | (2013.01) |
| G06N 20/00 | (2019.01) |
| G06N 5/04 | (2006.01) |
| G06F 40/40 | (2020.01) |
| G06F 8/71 | (2018.01) |

(52) U.S. Cl.
CPC ...... *G06F 11/3688* (2013.01); *G06F 11/3684* (2013.01); *G06F 11/3692* (2013.01); *G06F 21/602* (2013.01); *G06F 40/40* (2020.01); *G06N 5/04* (2013.01); *G06N 20/00* (2019.01); *G06F 8/71* (2013.01)

(58) Field of Classification Search
None
See application file for complete search history.

(56) References Cited

U.S. PATENT DOCUMENTS

| | | |
|---|---|---|
| 8,627,296 B1 | 1/2014 | Picard |
| 9,535,823 B2 | 1/2017 | Peretz et al. |
| 9,589,579 B2 | 3/2017 | Brown et al. |
| 10,007,594 B2 | 6/2018 | Andrejko et al. |
| 10,216,509 B2 | 2/2019 | Martin Vicente et al. |
| 11,010,283 B2 | 5/2021 | Li |
| 2005/0204343 A1 | 9/2005 | Kisamore et al. |
| 2007/0168744 A1 | 7/2007 | Pal et al. |
| 2009/0249297 A1 | 10/2009 | Doshi et al. |
| 2009/0288070 A1 | 11/2009 | Cohen et al. |
| 2010/0058300 A1 | 3/2010 | Zeng et al. |

(Continued)

FOREIGN PATENT DOCUMENTS

| | | | |
|---|---|---|---|
| CN | 104102574 B | 12/2017 | |
| CN | 109308258 A | * 8/2018 | .......... G06F 11/3664 |

OTHER PUBLICATIONS

Kasturi, "Some Aspects of Test Data Management Strategy", 2020, IEEE (Year: 2020).*

(Continued)

*Primary Examiner* — Hossain M Morshed
(74) *Attorney, Agent, or Firm* — Banner & Witcoff, Ltd.

(57) ABSTRACT

Various aspects of the disclosure relate to test automation systems with pre-compilers to validate various steps associated with a test script. An artificial intelligence (AI)-based pre-compiler may use natural language processing (NLP) to validate various steps associated with a test script associated with an application. Other aspects of this disclosure relate to automated encryption and mocking of test input data associated with test scripts.

20 Claims, 7 Drawing Sheets

(56) References Cited

U.S. PATENT DOCUMENTS

| | | | |
|---|---|---|---|
| 2015/0154415 A1* | 6/2015 | Wu | G06F 11/3684 |
| | | | 713/165 |
| 2016/0132421 A1 | 5/2016 | Cobb, Jr. et al. | |
| 2018/0189170 A1* | 7/2018 | Dwarakanath | G06F 11/3684 |
| 2018/0260309 A1* | 9/2018 | Simoni | G06F 11/3684 |
| 2019/0324886 A1* | 10/2019 | Champlin-Scharff | |
| | | | G06F 9/451 |
| 2021/0294733 A1* | 9/2021 | Jena | G06F 11/368 |
| 2021/0334384 A1* | 10/2021 | Ranjan | G06F 11/3636 |
| 2022/0308988 A1* | 9/2022 | Thomas | G06F 11/3684 |

OTHER PUBLICATIONS

Automation Panda; "BDD 101: The Gherkin Language"; a blog for software development and testing; https://automationpanda.com/2017/01/26/bdd-101-the-gherkin-language/; artcle. 5 pages; downloaded Jun. 24, 2021.

* cited by examiner

NATURAL LANGUAGE PROCESSING (NLP)-BASED CROSS FORMAT PRE-COMPILER FOR TEST AUTOMATION

FIELD

Aspects described herein generally relate to the field of software test automation frameworks and more specifically to pre-compilation of test scripts for inclusion in a test automation pipeline.

BACKGROUND

Software application development involves the use of test scripts for software testing to ensure that the application performs as per specifications and to isolate any issues prior to release to a production environment. For example, software testing may comprise regression testing in which test scripts may be used to attempt to expose bugs (by executing test cases). The test scripts may be periodically executed (e.g., after an application update) to check if an application is exhibiting errors or if a previously patched error has resurfaced. Such processes may be a part of a continuous integration and continuous delivery (CI/CD) pipeline as used by organizations for application development. A test automation pipeline may be used to automate various processes associated with development, validation, and execution of test scripts. The various steps may be constrained by guidelines and checklists that must be followed before the test scripts may be committed to the test automation pipeline.

SUMMARY

Aspects of the disclosure provide solutions that address and overcome technical problems associated with test automation. In particular, one or more aspects of the disclosure relate to pre-compilation of test scripts prior to storing of test scripts in a repository. Pre-compilation of test scripts may comprise artificial intelligence (AI)-based validation of steps associated with test scripts using natural language processing (NLP).

A system of one or more computers can be configured to perform particular operations or actions by virtue of having software, firmware, hardware, or a combination of them installed on the system that in operation causes or cause the system to perform the actions. The system may comprise a user computing device and a test automation platform (e.g., communicatively coupled to the user device). The user computing device may be configured to submit, via a source code collaboration system and to a test automation platform, a test script associated with an application. The test script may comprise an ordered sequence of a plurality of steps for testing the application. The test automation platform may comprise: at least one processor; and memory storing computer-readable instructions that, when executed by the at least one processor, cause the test automation platform to perform one or more operations. For example, the test automation platform may receive, from the user computing device, the test script associated with the application. Further, the test automation platform may evaluate, prior to compilation of the test script and using a natural language processing (NLP)-based evaluation module, the test script. The evaluating may comprise: determining whether the plurality of steps of the test script are in a valid order, and determining whether any steps are missing from the plurality of steps of the test script. Based on successful evaluation of the test script, the test automation platform may add the test script to a source code repository corresponding to the test automation pipeline and compile the test script in the source code repository. The test automation platform may execute, based on a trigger and for testing the application, the test script, and send, based on the execution of the test script, a test report. The test report may be based on a comparison between: an expected outcome based on the execution of the test script, and an actual outcome based on the execution of the test script.

Implementations may comprise one or more of the additional features. A step of the plurality of steps may indicate a test input for the application. Executing the test script may comprise applying the test input to the application to generate an outcome for the test input. Another step of the plurality of steps may indicate an expected outcome for the test input. The test report may indicate a comparison of the expected outcome for the test input and the outcome for the test input. For example, the application may correspond to a graphical user interface (GUI), the test input may be an input via the GUI, and the expected outcome may be a second GUI. The evaluating may comprise: predicting, using the NLP-based evaluation module and based on one or more previous steps of the test script, a predicted next step of the test script; comparing the predicted next step of the test script with a step, of the test script, following the one or more previous steps; and determining whether the predicted next step of the test script is the same as the step following the one or more previous steps. The successful evaluation of the test script may comprise determining that predicted steps of the test script are the same as the plurality of steps of the test script. The NLP-based evaluation module may comprise a neural network that is trained based on a set of pre-validated test scripts associated with the application. The trigger may include determining that an update has been made to the application. Implementations of the described techniques may include hardware, a method or process, or computer software on a computer-accessible medium.

One general aspect includes a system for pre-compilation of test scripts. The system may comprise a user computing device configured to submit, via a source code collaboration system and to a test automation platform, a test script associated with an application. The test script may comprise an ordered sequence of a plurality of steps for testing the application. The system may further comprise a test automation platform communicatively coupled to the user computing device, where the test automation platform may comprise: at least one processor; and memory storing computer-readable instructions that, when executed by the at least one processor, cause the test automation platform to perform one or more operations. For example, the test automation platform may receive, from the user computing device, the test script associated with the application. Further, the test automation platform may evaluate, prior to compilation of the received test script and using a natural language processing (NLP)-based evaluation module, the test script. The evaluating may comprise: predicting, based on one or more previous steps of the test script, a predicted next step of the test script; comparing the predicted next step with a step, of the test script, following the one or more previous steps; and determining, based on the predicted next step not being the same as the step following the one or more previous steps, a pre-compilation error. Based on the evaluating, the test automation platform may send, to the user computing device, a notification, where the notification indicates the pre-compilation error.

Implementations may include one or more of the following features. The notification may indicate the predicted next step of the test script. The test automation platform may add the test script to a source code repository, where adding the test script to source code repository may comprise replacing the step following the one or more previous steps with the predicted next step of the test script. The test automation platform may compile the test script in the source code repository and execute, based on a trigger and for testing the application, the test script. Further, the test automation platform may send, based on the execution of the test script, a test report. The test report may be based on a comparison between: an expected outcome based on the execution of the test script, and an actual outcome based on the execution of the test script. The trigger may include determining that an update has been made to the application. A step, of the plurality of steps, may indicate a test input for the application. The executing the test script may comprise applying the test input to the application to generate an outcome for the test input. Another step of the plurality of steps may indicate an expected outcome for the test input. The test report may indicate a comparison of the expected outcome for the test input and the outcome for the test input. For example, the application may correspond to a graphical user interface (GUI), the test input may be an input via the GUI, and the expected outcome may be a second GUI. The NLP-based evaluation module may include a neural network that may be trained based on a set of pre-validated test scripts associated with the application. Implementations of the described techniques may include hardware, a method or process, or computer software on a computer-accessible medium.

One general aspect includes a system for pre-compilation and executing of test scripts. The system may comprise a user computing device configured to submit, via a source code collaboration system and to a test automation platform: a test script associated with an application, where the test script may include an ordered sequence of a plurality of steps for testing the application, and input test data associated with the plurality of steps. The system may also comprise the test automation platform communicatively to the user computing device, where the test automation platform may comprise: at least one processor; and memory storing computer-readable instructions that, when executed by the at least one processor, cause the test automation platform to perform one or more operations. For example, the test automation platform may receive, from the user computing device, the test script and the input test data. Prior to compiling the test script, test automation platform may: evaluate, using a natural language processing (NLP)-based evaluation module, the plurality of steps associated with the test script; determine, based on one or more rules, that a first portion and a second portion of the input test data may include sensitive information; and based on the determining that the first portion and the second portion of the input test data may include sensitive information, encrypt the first portion of the input test data, and mock the second portion of the input test data. The mocking may include replacing the second portion of the input test data with mock data. The test automation platform may add, based on successful evaluation of the test script, the test script and modified input test data to a source code repository, where the modified input test data may include the encrypted first portion of the input test data, and the mocked second portion of the input test data. Further, the test automation platform may compile the test script in the source code repository and execute, based on a trigger and for testing the application, the test script. The modified input test data may be used as an input for the application. The test automation platform may send, based on the execution of the test script, a test report. The test report may be based on a comparison between: expected outcomes based on the execution of the test script, and determined outcomes based on execution of the test script.

Implementations may include one or more of the following features. The evaluating the test script may comprise: predicting, using the NLP-based evaluation module and based on one or more previous steps of the test script, a predicted next step of the test script; comparing the predicted next step of the test script with a step, of the test script, following the one or more previous steps; and determining whether the predicted next step of the test script is the same as the step following the one or more previous steps. The successful evaluation of the test script may comprise determining that predicted steps of the test script are the same as the plurality of steps of the test script. The trigger may comprise determining that an update has been made to the application. The determining that the first portion and the second portion of the input test data may include sensitive information may be based on field names associated with the first portion and the second portion of the input test data. A step of the plurality of steps may indicates a test input for the application, and executing the test script may comprise applying the test input to the application to generate an outcome for the test input. Another step of the plurality of steps may indicate an expected outcome for the test input. The test report may indicate a comparison of the expected outcome for the test input and the outcome for the test input. For example, the application may correspond to a graphical user interface (GUI), the test input may be an input via the GUI, and the expected outcome may a second GUI. Implementations of the described techniques may include hardware, a method or process, or computer software on a computer-accessible medium.

One general aspect includes a method for pre-compilation and execution of test scripts in a test automation pipeline. The method may comprise receiving, from a user computing device, a test script associated with an application. The test script may include an ordered sequence of a plurality of steps for testing the application and input test data associated with the plurality of steps. The method may also comprise, prior to compiling the test script: evaluating, using a natural language processing (NLP)-based evaluation module, the plurality of steps associated with the test script; determining, based on one or more rules, that at least a portion of the input test data may include sensitive information; and encrypting, based on the determining that the input test data may include sensitive information, the at least the portion of the input test data to generate modified input test data. The method may also comprise adding, based on successful evaluation of the test script, the test script and the modified input test data to a source code repository. The method may also comprise compiling the test script in the source code repository and executing, based on a trigger and for testing the application, the test script. The modified input test data may be used as an input for the application. The method also includes sending, based on the execution of the test script, a test report. The test report may be based on a comparison between: expected outcomes based on the execution of the test script, and determined outcomes based on execution of the test script. Other embodiments of this aspect include corresponding computer systems, apparatus, and computer programs recorded on one or more computer storage devices, each configured to perform the actions of the methods.

Implementations may include one or more of the following features. The evaluating the plurality of steps associated with the test script may comprise: predicting, using the NLP-based evaluation module and based on one or more previous steps of the test script, a predicted next step of the test script; comparing the predicted next step of the test script with a step, of the test script, following the one or more previous steps; and determining whether the predicted next step of the test script is the same as the step following the one or more previous steps. The successful evaluation of the test script may comprise determining that predicted steps of the test script are the same as the plurality of steps of the test script. The trigger may comprise determining that an update has been made to the application. The determining that the at least the portion of the input test data may include sensitive information is based on field names associated with the at least the portion of the input test data. A step of the plurality of steps may indicate a test input for the application, and executing the test script may comprise applying the test input to the application to generate an outcome for the test input. Another step of the plurality of steps may indicate an expected outcome for the test input. The test report may indicate a comparison of the expected outcome for the test input and the outcome for the test input. For example, the application may correspond to a graphical user interface (GUI), the test input may be an input via the GUI, and the expected outcome may be a second GUI. Implementations of the described techniques may include hardware, a method or process, or computer software on a computer-accessible medium.

One general aspect includes a method for pre-compilation and execution of test scripts in a test automation pipeline. The method may comprise receiving, from a user computing device, a test script associated with an application. The test script may comprise an ordered sequence of a plurality of steps for testing the application, and input test data associated with the plurality of steps. The method may also comprise, prior to compiling the test script: evaluating, using a natural language processing (NLP)-based evaluation module, the plurality of steps associated with the test script; determining, based on one or more rules, that at least a portion of the input test data may include sensitive information; and mocking, based on the determining that the input test data may include sensitive information, the at least the portion of the input test data to generate modified input test data. The mocking may comprise replacing the at least the portion of the input test data with mock data. The method may also comprise adding, based on successful evaluation of the test script, the test script and the modified input test data to a source code repository. The method may also comprise compiling the test script in the source code repository. The method may also comprise executing, based on a trigger and for testing the application, the test script, where the modified input test data may be used as an input for the application. The method may also comprise sending, based on the execution of the test script, a test report. The test report may be based on a comparison between: expected outcomes based on the execution of the test script, and determined outcomes based on execution of the test script. Other embodiments of this aspect include corresponding computer systems, apparatus, and computer programs recorded on one or more computer storage devices, each configured to perform the actions of the methods.

Implementations may include one or more of the following features. The evaluating the plurality of steps associated with the test script may comprise: predicting, using the NLP-based evaluation module and based on one or more previous steps of the test script, a predicted next step of the test script; comparing the predicted next step of the test script with a step, of the test script, following the one or more previous steps; and determining whether the predicted next step of the test script is the same as the step following the one or more previous steps. The successful evaluation of the test script may comprise determining that predicted steps of the test script are the same as the plurality of steps of the test script. The determining that the at least the portion of the input test data may include sensitive information may be based on field names associated with the at least the portion of the input test data. Implementations of the described techniques may include hardware, a method or process, or computer software on a computer-accessible medium.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

A test automation pipeline may include test scripts and supporting artifacts (e.g., test input data, configuration files) as key components. Absence of the cross format pre-compilers in the test automation pipeline may cause the incorporation of test script evaluation and artifact validation processes during execution phase. As such, any issues that need to be resolved with test scripts may only be detected during execution of the test scripts. While compilers associated with application frameworks used for application development may be used for validation of artifacts, this may only be achieved at the cost of degraded compiler performance.

Various examples herein describe a cross-format pre-compiler to identify failures in the test automation pipeline before executing the test cases (e.g., as part of regression testing in an application framework). The pre-compiler may be integrated with any source code collaboration tool or build validation tool, and may be used evaluate a test automation suite (with test scripts, test input data, and associated configuration files) using an artificial intelligence-natural language processing (AI-NLP) model. Any artifacts can be pre-compiled using a rule engine. The evaluations may provide immediate feedback to user even before the test automation suite is integrated to a test automation pipeline.

Figure 1A:
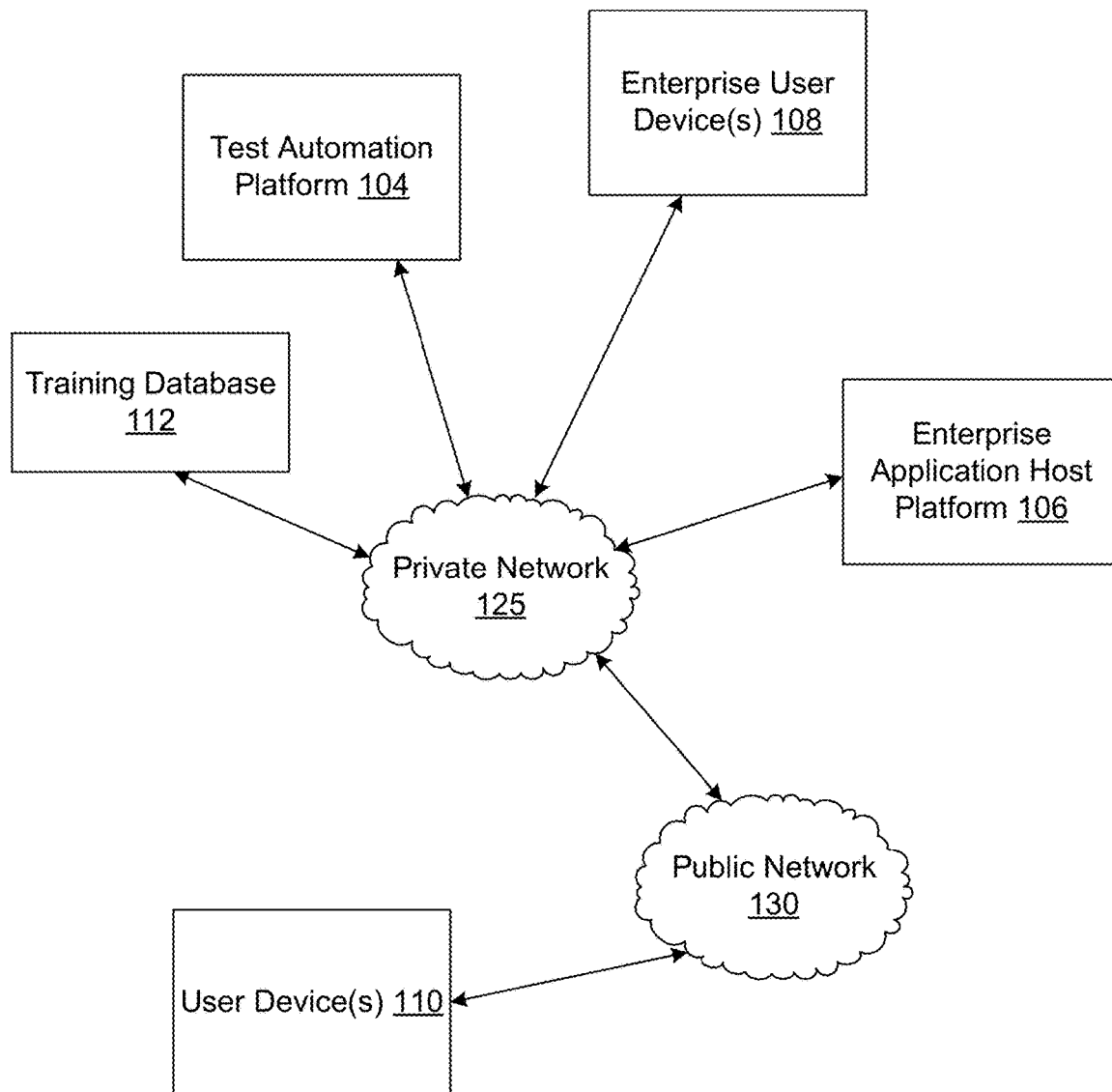
FIG. 1A shows an illustrative computing environment for test automation, in accordance with one or more example arrangements.

FIG. 1A shows an illustrative computing environment 100 for test automation, in accordance with one or more arrangements. The computing environment 100 may comprise one or more devices (e.g., computer systems, communication devices, and the like). The computing environment 100 may comprise, for example, a test automation platform 104, an enterprise application host platform 106, a training database 112, and/or one or more enterprise user devices 108. The one or more of the devices and/or systems, may be linked over a private network 125 associated with an enterprise organization (e.g., a financial institution). The computing environment 100 may additionally comprise one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.).

The test automation platform 104 may comprise one or more computing devices and/or other computer components (e.g., processors, memories, communication interfaces) configured to perform one or more functions as described herein. Further details associated with the architecture of the test script automation platform 104 are described with reference to FIG. 1B.

The enterprise application host platform 106 may comprise one or more computing devices and/or other computer components (e.g., processors, memories, communication interfaces). In addition, the enterprise application host platform 106 may be configured to host, execute, and/or otherwise provide one or more enterprise applications. In an arrangement where the private network 125 is associated with a banking organization, the enterprise application host platform 106 may be configured, for example, to host, execute, and/or otherwise provide one or more transaction processing programs, such as an online banking application, fund transfer applications, and/or other programs associated with the financial institution. The enterprise application host platform 106 may comprise various servers and/or databases that store and/or otherwise maintain account information, such as financial account information including account balances, transaction history, account owner information, and/or other information. In addition, the enterprise application host platform 106 may process and/or otherwise execute transactions on specific accounts based on commands and/or other information received from other computer systems comprising the computing environment 100.

The enterprise user computing device 108 may be a personal computing device (e.g., desktop computer, laptop computer) or mobile computing device (e.g., smartphone, tablet). In addition, an enterprise user computing device 108 may be linked to and/or operated by a specific enterprise user (who may, for example, be an employee or other affiliate of the enterprise organization).

The user device(s) 110 may be computing devices (e.g., desktop computers, laptop computers) or mobile computing device (e.g., smartphones, tablets) connected to the network 125. The user device(s) 102 may be configured to enable the user to access the various functionalities provided by the devices, applications, and/or systems in the network 125.

Training database 112 may comprise one or more computer-readable memories storing validated test scripts. The validated test scripts may be used for training an AI-NLP model to be used by a pre-compiler engine of the test automation platform 104 as further described herein.

In one or more arrangements, the test automation platform 104, the enterprise application host platform 106, the enterprise user devices 108, the user devices 110, and/or the other devices/systems in the computing environment 100 may be any type of computing device capable of receiving input via a user interface, and communicating the received input to one or more other computing devices in the computing environment 100. For example, the test automation platform 104, the enterprise application host platform 106, the enterprise user devices 108, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the test automation platform 104, the enterprise application host platform 106, the enterprise user devices 108, the user devices 110, and/or the other devices/systems in the computing environment 100 may, in some instances, be and/or comprise special-purpose computing devices configured to perform specific functions.

Figure 1B:
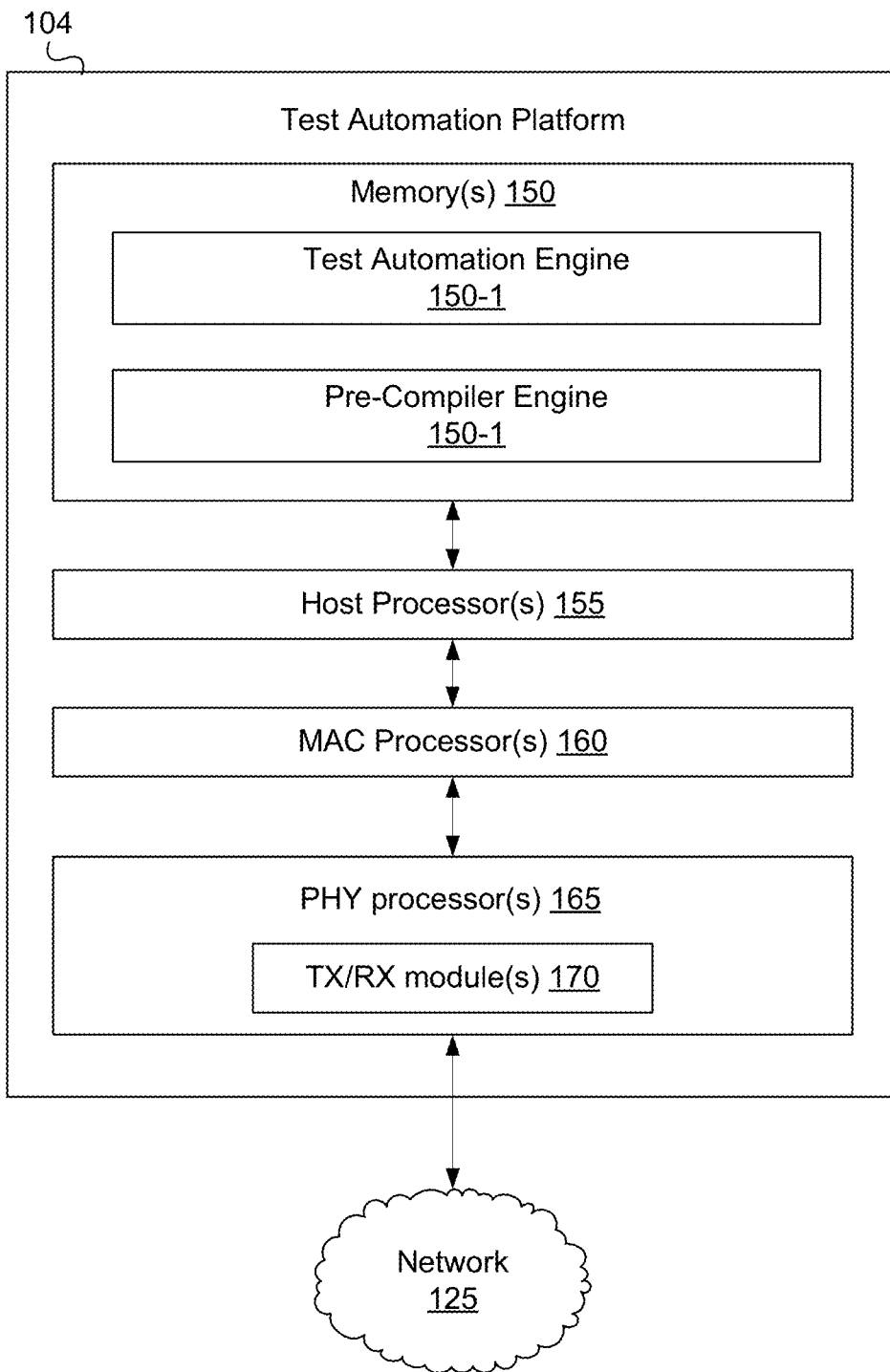
FIG. 1B shows an example test automation platform, in accordance with one or more example arrangements.

FIG. 1B shows an example test automation platform 104 in accordance with one or more examples described herein. The test automation platform 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The test automation platform 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. Memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the test automation platform 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 155. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the test automation platform 104 may be configured to execute machine readable instructions stored in memory 150. The memory 150 may comprise (i) one or more program modules/engines having instructions that when executed by the one or more processors cause the test automation platform 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the test automation platform 104 and/or by different computing devices that may form and/or otherwise make up the test automation platform 104. For example, the memory 150 may have, store, and/or comprise a test automation engine 150-1 and/or pre-compiler engine 150-2. The test automation engine 150-1 may have instructions that direct and/or cause the test automation platform 104 to perform one or more operations associated with test script development, compilation, validation, and/or execution of test scripts in accordance with a test automation pipeline. The pre-compiler engine 150-2 may have instructions that may cause the test script automation platform 104 to implement a pre-compiler core to perform various steps associated with pre-compiling test scripts and associated information submitted by a user (e.g., via an enterprise user device 108).

While FIG. 1A illustrates the test script automation platform 104, the enterprise application host platform 106, and the enterprise user devices 108, as being separate elements connected in the private network 125, in one or more other arrangements, functions of one or more of the above may be integrated in a single device/network of devices. For example, elements in the test script automation platform 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the enterprise application host platform 106, and/or the enterprise user devices 108.

Figure 2:
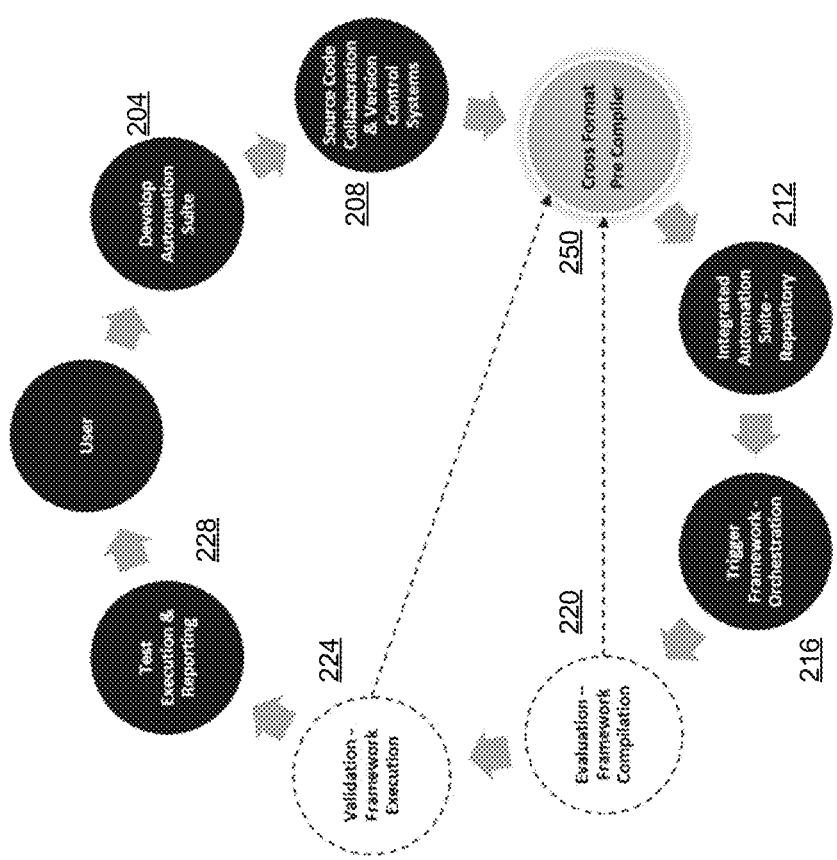
FIG. 2 shows an example test automation pipeline, in accordance with one or more example arrangements.

FIG. 2 shows an example test automation pipeline. The test automation pipeline comprises multiple steps to be performed by a user (e.g., associated with an enterprise computing device 108) and/or the test automation platform 104. The test automation pipeline may be used to develop, validate, and execute test automation suites in a test automation framework for an application. A test automation suite may be associated with configuration-based test automation development or behavior-driven test automation development. A test automation suite may comprise one or more test scripts and associated test input data/configuration files.

One or more developers may create (e.g., step 204) a test automation suite (e.g., comprising a plurality of test scripts, test input data, configuration files, etc.) for an application. A test script may comprise an ordered sequence of a plurality of steps for testing the application, for example, written in a human-readable language (e.g., in plain English, such as using Gherkin syntax). A test script written in a human-readable language may have a structure indicating an initial state of the application, a test user action performed on the initial state (e.g., within the application), and an expected outcome of the action (e.g., to be used for verification of a test outcome by the test automation platform) 104.

For example, the ordered sequence of steps may comprise event steps (e.g., a test action within the application), outcome steps (e.g., expected outcome based on the event), scenario steps (e.g., an action/outcome that has previously occurred, an initial state of an application), etc. For example, an application may involve an end user logging in to a user profile by inputting user credentials (e.g., a user name and a password) via a graphical user interface (GUI). The test automation suite may comprise a script for testing the various steps associated with the GUI (e.g., inputting user credentials, submitting the user credentials by clicking a "submit" button, displaying a confirmation screen, etc.). The script, for example, may cause input of user credentials, clicking of the submit button, and verification of the confirmation screen. The test automation suite may further comprise test input data to be used (e.g., test user names, passwords, etc.) A source code collaboration and version control system (e.g., Git, Apache Subversion, etc.) may be used to enable multiple users to collaborate (e.g., step 208) in development of the test automation suite and maintain different versions of test scripts, test input data, and/or configuration files.

The source code collaboration and version control system may be associated with a repository (e.g., Bitbucket) that may be used for storing the generated test scripts/test automation suites (e.g., step 212). A test automation suite may be triggered (e.g., step 216) from the repository based on one or more triggers. A trigger may be an update made to the application, a manual command, or may be periodic (e.g., the test automation suite may be automatically triggered every few days, few weeks, etc.).

Once triggered, the test automation suite may be compiled (e.g., step 220) into a format that is understandable to a test automation framework in which the test automation suite is to be used. For example, the test scripts (e.g., in Gherkin language), test input data, and/or the configuration files (e.g., in .xml format) may be compiled into an executable file (e.g., in a Python format, or a JavaScript object notation (JSON) format) that may be understandable from the test automation framework perspective.

The compiled test automation suite may then be evaluated to ensure that the test scripts and the configuration files are valid for use in test execution and/or are present in the executable file (e.g., step 224). The executable file may be evaluated to determine if the file is corrupt. Steps within the compiled test automation suite may evaluated to ensure that they are valid for the application being tested. Evaluating the steps may comprise determining if the steps are in a correct order, or if all steps required for testing are present. The evaluation may be test automation framework dependent. For example, a test automation framework may accept test input data in a specific spreadsheet format. The compiled test automation suite may be evaluated to ensure that any test input data is in the form of the specific spreadsheet format. With reference to the example where the test automation suite is for testing aspects associated with logging into the application, the evaluation may comprise checking if the compiled test automation suite includes strings for user names/passwords to use for testing and includes code for interacting with the test automation framework.

Once the compiled test automation suite is validated, it may be executed against the application (e.g., step 228). A test automation framework/tool (e.g., Selenium) may enable execution of the compiled test automation suite against the application. With reference to the example where the test automation suite is for testing aspects associated with a GUI for logging into the application, the execution may comprise determining if the GUI is able to receive user credentials and display the results of validation of user credentials. For example, the execution of the test automation suite may determine if the GUI is able to display prompts for inputting the user credentials (e.g., display a text box for the user credentials), receive the user credentials, and display a result of validation of the user credentials. The results of the execution of the test automation suite may be passed on to a user (e.g., associated with an enterprise computing device 108) for analysis.

Any errors in the test automation suite (e.g., a corrupted executable file, improper order of steps in a test script of the test automation suite, missing steps in the test script, etc.) may only be detected during compilation and/or execution of the test automation suite (e.g., steps, 220, 224, 228). Therefore, revisions that need to be made to test scripts to resolve these errors may only be determined during execution. This may result in inefficiencies during development of test scripts. The test automation suite may be based on scripts submitted by a large number of users. As such, any errors encountered during execution may require rework for editing the test scripts and significant slowdown in application development.

Various examples herein describe the use of a cross-format pre-compiler to overcome the above issues. The cross-format pre-compiler may evaluate (e.g., step 250) the test automation suite, in real-time, using natural language processing and/or one or more other processes. The evaluation may be performed prior to storing the test automation suite to the repository. This may ensure that any errors encountered are detected and rectified prior to committing to the repository and not during execution of the test automation suite. The cross-format pre-compiler may be generic and framework independent, allowing it to be compatible with any source code collaboration and version control system.

Figure 3:
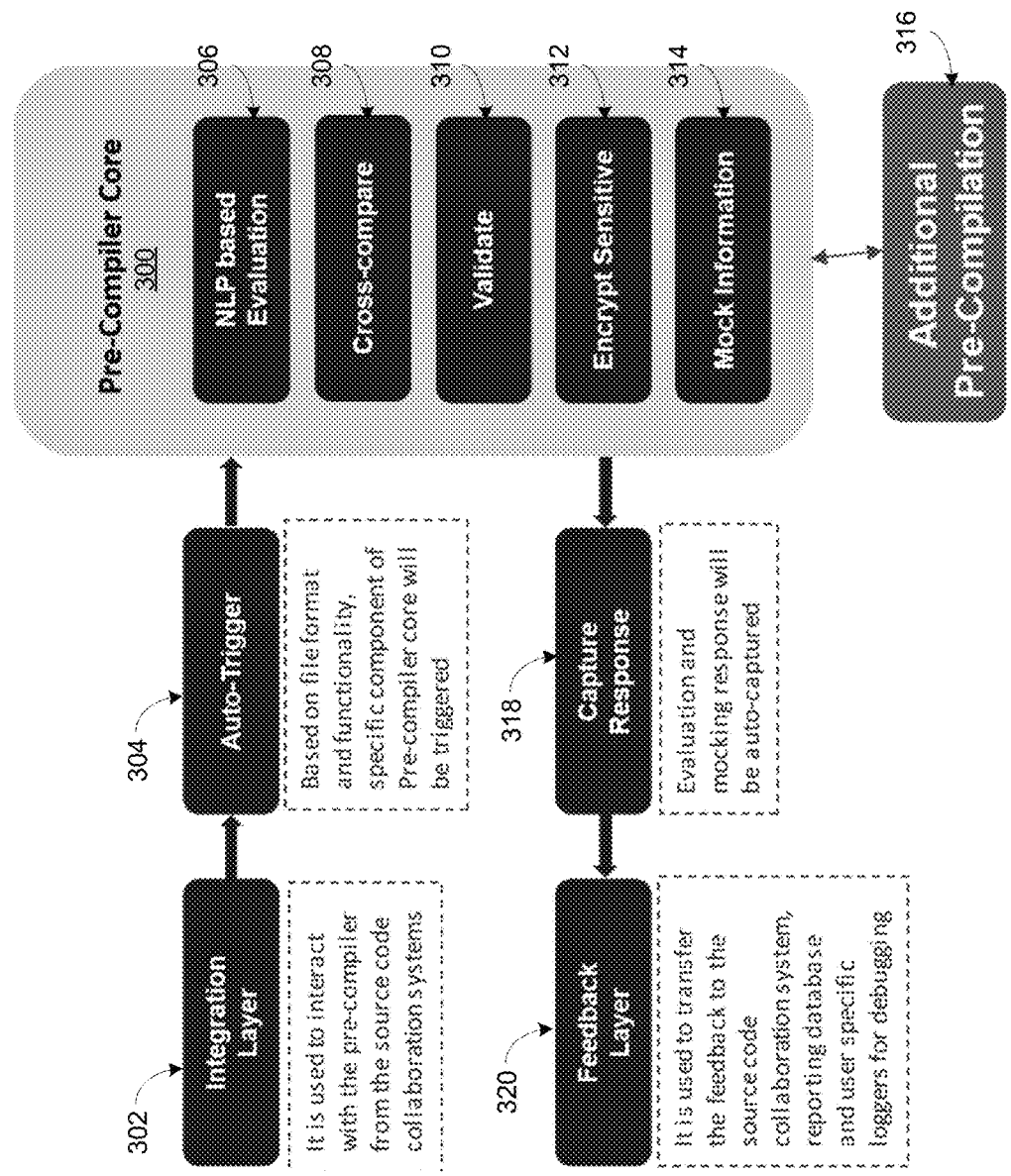
FIG. 3 shows an example pre-compiler as implemented by a pre-compiler engine associated with a test automation platform, in accordance with one or more example arrangements.

FIG. 3 shows an example operation of a pre-compiler 300 as implemented by the pre-compiler engine 150-1 associated with the test automation platform 104. The pre-compiler 300 may comprise, for example, an NLP-based evaluation module 306, a cross-comparison module 308, a validation module 310, an encryption module 312, and an information mocking module 314. The pre-compiler 300 may further comprise other modules 316 as may be used by the pre-compiler 300 for various pre-compilation tasks as per application requirement.

An integration layer 302 may interact with the source code collaboration and version control system to receive test scripts, test input data, and/or configuration files associated with an application (e.g., from an enterprise user device 108). An auto-trigger module 304 may determine one or more components of the pre-compiler 300 (e.g., the NLP-based evaluation module 306, the cross-comparison module 308, the validation module 310, the encryption module 312, the mocking module 314, and/or other modules 316) to use based on the received test scripts, the test input data, and/or the configuration files. For example, the auto-trigger module 304 may determine to use an NLP-based evaluation module 306 for test scripts corresponding to particular file formats (e.g., a Gherkin format, any other human-readable language format) and may determine to skip the use of the NLP-based evaluation module 306 for test scripts corresponding to other file formats. The auto-trigger module 304 may determine to use the encryption module 312 and/or the mocking module, for example, if the test input data comprises sensitive and/or confidential information.

The NLP-based evaluation module 306 may be used on the test script because the test script may use a human-readable language outlining the various aspects associated with the test script and the application to be tested (e.g., initial state, user action, expected outcome). The NLP-based evaluation module 306 may evaluate the steps associated with a test script to determine if they are in a valid order. Further, the NLP-based evaluation module 306 may evaluate the test script to determine if test script is not missing any required steps. The NLP-based evaluation module 306 may evaluate the steps based on an AI model corresponding to the test script.

The NLP-based evaluation module 306 may use NLP to interpret the various steps (e.g., determine intents associated with the steps) of a test script. Interpreting a step may comprise determining whether a step corresponds to an initial state, a user action, or an expected outcome. The NLP may use a rule-based approach or a machine learning-based approach for interpreting the various steps. A rule-based approach may comprise user-defined rules, as input by an administrator, to determine an intent associated with a step of the test script. A machine learning-based approach may determine an intent associated with a step based on an AI model that is trained using training data (e.g., comprising other test scripts).

Based on interpreting the steps, the NLP-based evaluation module 306 may check whether the steps are in a correct order, whether steps are missing, etc. For example, the NLP-based evaluation module 306 may determine whether a first step of the test script corresponds to setting an initial state for the application. As another example, the NLP-based evaluation module 306 may determine whether a step corresponding to a user action precedes a step corresponding an expected outcome. The NLP-based evaluation module 306 may comprise an AI model trained to identify whether the steps are in a correct order and/or whether one or more steps are missing from the test script. The AI model may be trained based on a plurality of user-validated test scripts associated with the application.

For example, an application may correspond to a GUI for inputting user credentials to log into a software system (e.g., an email system). The GUI may have text boxes allowing a user to input credentials and click a submit button. Based on validation of user credentials a second GUI may be displayed (e.g., with an error message if credentials are invalid, a with an email inbox if credentials are valid). As such, a valid test script may comprise the following flow of steps: an initial state of GUI displaying text boxes for inputting (e.g., user name and password) in text boxes, inputting the user credentials in the text boxes, clicking a submit button, and checking if a result of validation of credentials is displayed. The NLP-based evaluation module 306 may determine whether one or more of the steps are missing in the flow of steps. For example, if the above test script does not comprise the step corresponding to clicking the submit button, the NLP-based evaluation module 306 may determine that test script is not valid and may further determine the missing step. For example, if the test script flow corresponds to inputting the user credentials followed by checking if a result of validation of credentials is displayed, the NLP-based evaluation module 306 may determine that the test script is not valid (e.g., the test script misses the step corresponding to clicking of the submit button).

The NLP-based evaluation module 306 may determine whether a step is missing or has an error based on comparing a predicted next step and an actual next step of the test script. For example, the NLP-based evaluation module 306 may determine, based on one or more previous steps of the test script, a predicted next step of the test script (e.g., the NLP-based evaluation module 306 may determine that inputting user credentials must be followed by clicking of the submit button). The NLP-based evaluation module 306 may compare the predicted next step of the test script with the actual next step of the test script. The NLP-based evaluation module 306 may determine that the test script has an error based on determining that the predicted next step is different from the actual next step (e.g., the actual next step following inputting of user credentials is checking if a result of validation of credentials is displayed). In an arrangement, the NLP-based evaluation module 306 may send a notification, to the enterprise user device 108, indicating that the test script may have an error and further indicating the predicted next step. The NLP-based evaluation module 306 may determine that the test script does not have any errors if predicted steps of the test script match the actual steps of the test script.

The cross-comparison module 308 may compare information in the test script and/or configuration file with other test scripts and/or configuration files associated with the application. For example, the cross-comparison module 308 may check the configuration file with other configuration files corresponding to a test automation framework for the application to determine that the configuration file is in a valid format. The other configuration files may have been previously validated.

The validation module 310 may determine if test input data (e.g., associated with/referenced by the test script) is compatible/consistent with test input data required by the test script. With reference to the test script is for an application corresponding to the GUI for logging into a software system, the test script may require an alphanumeric string as an input for the user credentials. However, if the test input data associated with the test script is of an integer data type, the validation module 310 may determine an error. As another example, the validation module 310 may determine an error if test input data is not available/present in the source code collaboration and version control system.

In an arrangement, the test input data may comprise sensitive information (e.g., user credentials such as user names/passwords) that must not be accessible to a user initiating test execution. The encryption module 312 may detect (e.g., based on evaluation of the test input data) sensitive information included in the test input data and encrypt the sensitive information. For example, the encryption module may check for phrases such as "user name" and "password" in field names of the test input data and determine to encrypt the data corresponding to "user name" and "password." The encrypted data may be decrypted during test execution (e.g., step 228) by the test automation framework. In this manner, sensitive information may be hidden from various user that may be associated with the test automation pipeline.

In addition to the encryption module 312, or alternatively, the mocking module 314 may replace sensitive information in test input data with mock data. The mocking module 312 may detect (e.g., based on one or more rules, such as detection of one or more phrases in field names) and replace the sensitive information with mock data. Mock data may correspond to randomized data. The mock data may be in a same data type as the test input data. For example, if test input data comprises user names in an alphanumeric format, the mocking module 312 may replace the user names with mock data comprises randomized alphanumeric data.

The results of the processes performed by the various modules in the pre-compiler 300 may be consolidated into a response report. A response module 318 may generate the response report and send it to a feedback layer 320. The feedback layer 320 may interact with the source code collaboration and version control system to provide an indication of whether the test scripts, test input data, and/or configuration files are valid for use or require correction. For example, the feedback layer 320 may send the response report to the enterprise user device 108. In an arrangement, the feedback layer 320 may send, based on determination by the pre-compiler core 300 that the test script, test input data, and/or configuration files are valid, the test script, test input data, and/or configuration files for storage in the repository. In an arrangement, the feedback layer 320 may send, based on determination by the pre-compiler core 300 that the test script, test input data, and/or configuration files are invalid, a response report indicating that the test script, the test input data, and/or configuration files are invalid. The response report may indicate suggested changes to be made to the test script (e.g., as determined by the NLP-based evaluation module 306).

A user associated with the enterprise user computing device 108 may review the response report and modify the test script, the test input data, and/or configuration files. The modified test script, test input data, and/or configuration files may then be added to the repository. In another example, the user may override the notification and the original submitted test script, test input data, and/or configuration files may be added to the repository.

In an arrangement, the pre-compiler 300 may determine, based on the NLP-based evaluation module 306, updates to the test script (e.g., based on determining errors in the test script). The pre-compiler 300 may determine, based on the encryption module 312 and/or the mocking module 314, encrypted or mocked test input data. The response module 318 may determine updated test script and (encrypted and/or mocked) test input data, and send the updated test script and the test input data to the feedback layer 320. The feedback layer 320 may add the updated test script and the test input data to the repository.

Figure 4:
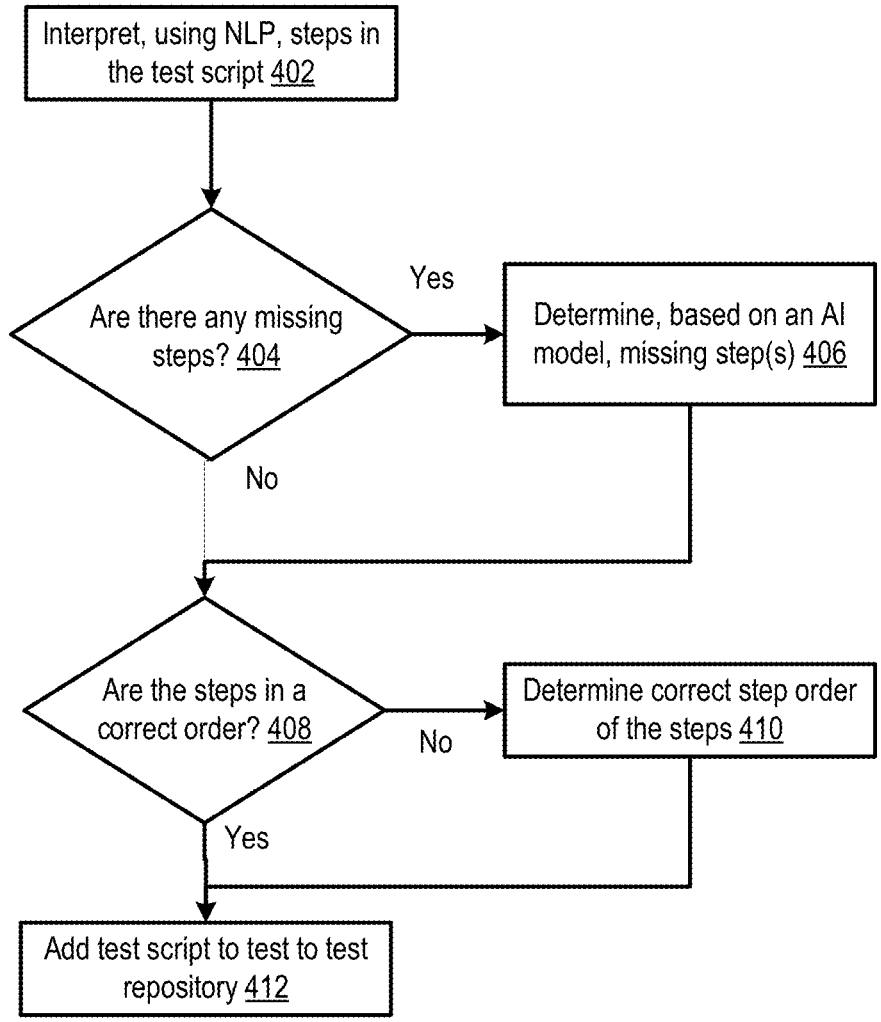
FIG. 4 shows an example algorithm for natural language processing (NLP)-based evaluation of a test script at a pre-compiler, in accordance with one or more example arrangements.

FIG. 4 shows an example algorithm for NLP-based evaluation of a test script at a pre-compiler 300. The example algorithm may be used at the NLP-based evaluation module 306 for validating and/or correcting the various steps in a test script (e.g., as submitted by the enterprise user device 108). At step 402, the NLP-based evaluation module 306 may interpret, using NLP, the various steps associated with the test scripts. Interpreting the steps of the test script may comprise determining whether a step corresponds to corresponds to an initial state of an application to be tested, a user action associated with the application, or an expected outcome based on the user action and the initial state.

An AI model for test script evaluation may be trained based on a plurality of other test scripts associated with the application. The AI model may then be used for the NLP-based evaluation of the test script. At step 404, the NLP-based evaluation module 306 may determine, based on an AI model, whether the test script is missing any steps. At step 406, and if any steps are missing from the test script, the AI model may determine and add the missing steps. At step 408, the NLP-based evaluation module 306 may check, based on an AI model, whether the steps of the test script are in a correct sequence/order. At step 410, and if the steps are not in a correct sequence, the NLP-based evaluation module 306 may determine the correct sequence to be used. At step 412, the pre-compiler 300 may add the test script (e.g., with the added missing steps and/or the corrected sequence) to the repository. Additionally, or alternatively, the pre-compiler 300 may send a response report to the enterprise user device 108, wherein the response report comprises indications of missing steps and/or steps in an incorrect sequence/order.

Figure 5:
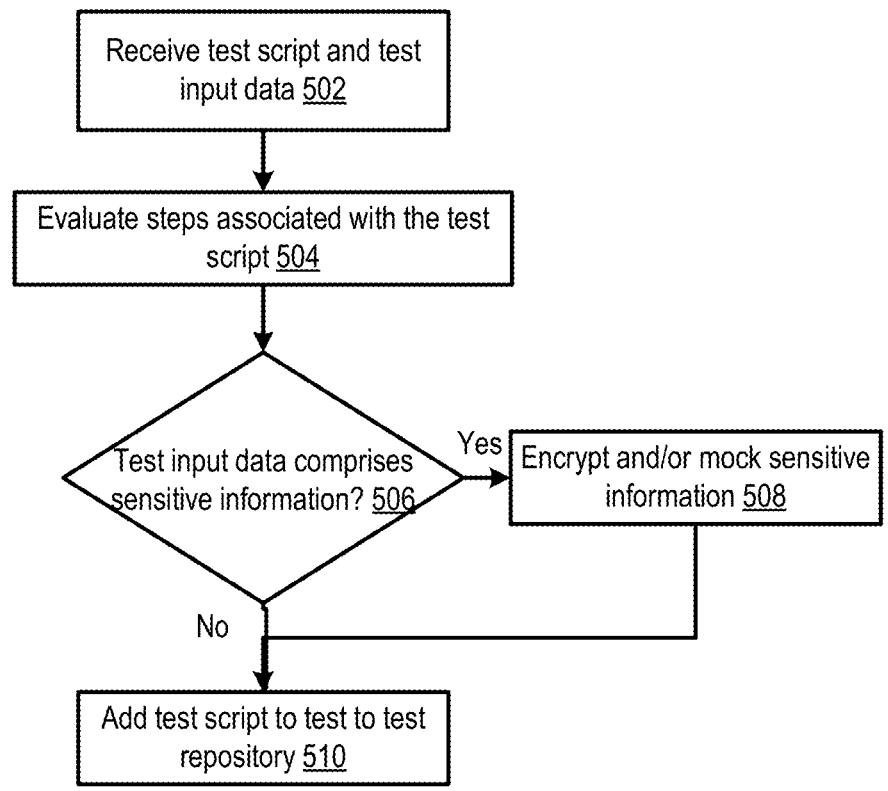
FIG. 5 shows an example algorithm for encrypting and/or mocking test input data at a pre-compiler, in accordance with one or more example arrangements.

FIG. 5 shows an example algorithm for encrypting and/or mocking test input data at a pre-compiler 300. At step 502, the pre-compiler 300 may receive a test script and test input data associated with the test script. At step 504, the pre-compiler 300 may (e.g., using an NLP-based evaluation module) may evaluate whether any steps are missing in steps associated with the test script and/or whether the steps associated with the test script are in a correct order (e.g., as described with respect to FIGS. 3 and 4). At step 506, the pre-compiler 300 may determine whether the test input data comprises any sensitive/confidential information. The pre-compiler 300 may determine whether the test input data comprises any sensitive/confidential information based on presence of certain keywords (e.g., user names, password, etc.) in the test input data. At step 508, the pre-compiler 300 may encrypt and/or mock the sensitive/confidential information in the test input data, if present. At step 510, the pre-compiler 300 may add the test script to the repository.

Various machine learning algorithms may be used for the NLP-based evaluation module 306 without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. As described herein, the machine learning algorithms and generated AI models may be used for determining/validating steps associated with test scripts and/or determining any changes to the test script that may need to be made.

Figure 6:
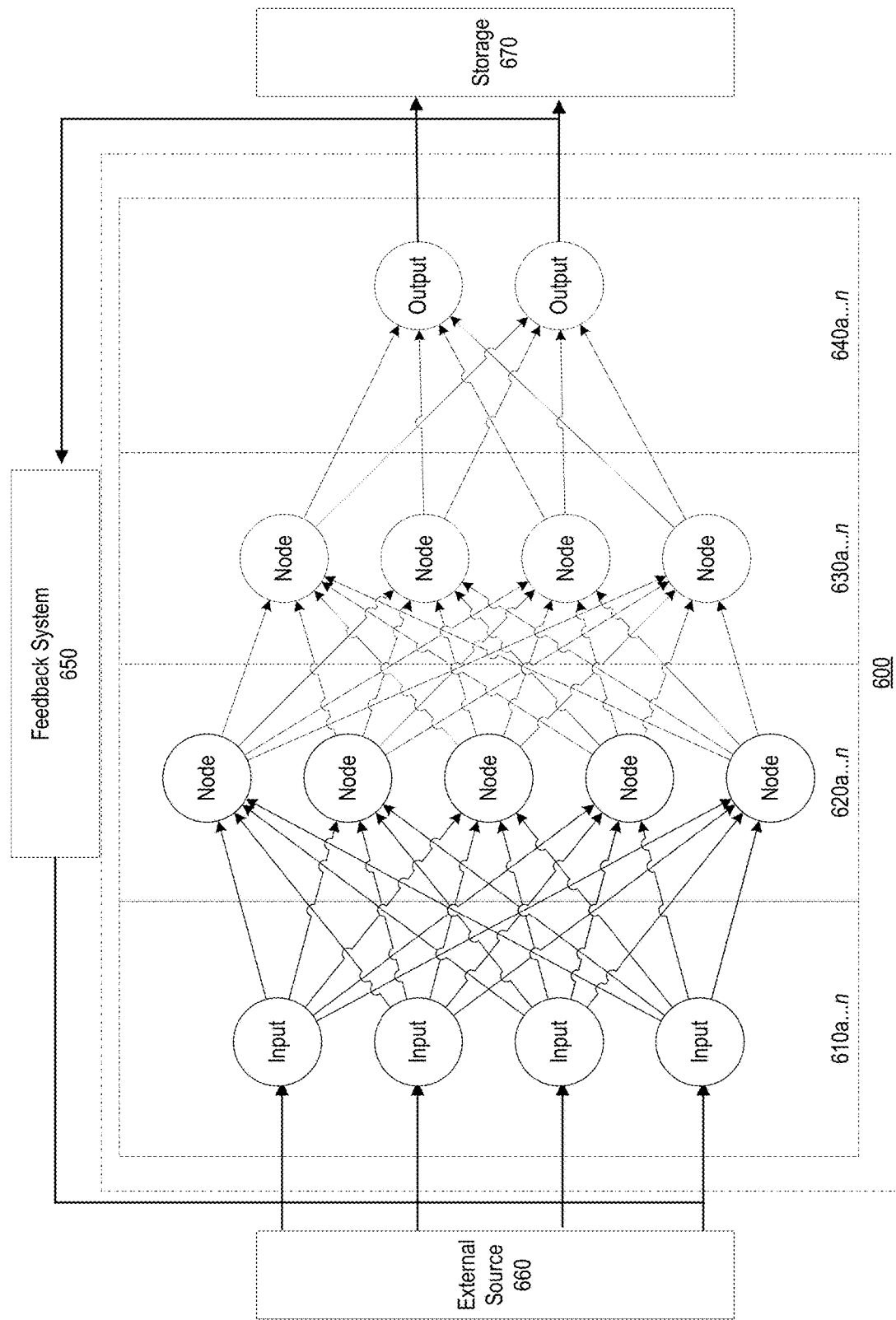
FIG. 6 shows a simplified example of an artificial neural network on which a machine learning algorithm may be executed, in accordance with one or more example arrangements.

FIG. 6 illustrates a simplified example of an artificial neural network 600 on which a machine learning algorithm may be executed. The machine learning algorithm may be used by the NLP-based evaluation module 306 to perform one or more functions as described herein (e.g., evaluating the test script, predicting a next step of the test script, etc.). FIG. 6 is merely an example of nonlinear processing using an artificial neural network; other forms of nonlinear processing may be used to implement a machine learning algorithm in accordance with features described herein.

In one example, a framework for a machine learning algorithm may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks. Such structures, while significantly more complex than conventional computer systems, are beneficial in implementing machine learning. For example, an artificial neural network may be comprised of a large set of nodes which, like neurons, may be dynamically configured to effectuate learning and decision-making.

Machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, an administrator.

Meanwhile, in supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of 1000 photos with labeled human faces and 10,000 random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "95% correct").

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

In practice, machine learning systems and their underlying components are tuned by data scientists to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals more clear, given the nearly infinite number of variables that can possible be optimized in the machine learning system. Meanwhile, one or more of data integration, selection, cleaning, and/or pre-processing steps can sometimes be the most time consuming because the old adage, "garbage in, garbage out," also reigns true in machine learning systems.

By way of example, in FIG. 6, each of input nodes 610a-n is connected to a first set of processing nodes 620a-n. Each of the first set of processing nodes 620a-n is connected to each of a second set of processing nodes 630a-n. Each of the second set of processing nodes 630a-n is connected to each of output nodes 640a-n. Though only two sets of processing nodes are shown, any number of processing nodes may be implemented. Similarly, though only four input nodes, five processing nodes, and two output nodes per set are shown in FIG. 6, any number of nodes may be implemented per set. Data flows in FIG. 6 are depicted from left to right: data may be input into an input node, may flow through one or more processing nodes, and may be output by an output node. Input into the input nodes 610a-n may originate from an external source 660. The input from the input nodes may be, for example, steps corresponding to a test script. Output may be sent to a feedback system 650 and/or to storage 670. The output from an output node may be an indication of whether the test script is valid or invalid. In another arrangement, the input from the input nodes may be, for example, one or more steps corresponding to a test script and the output from the output node may indicate a predicted next step of the test script. The feedback system 650 may send output to the input nodes 610a-n for successive processing iterations with the same or different input data.

In one illustrative method using feedback system 650, the system may use machine learning to determine an output. The system may use one of a myriad of machine learning models including xg-boosted decision trees, auto-encoders, perceptron, decision trees, support vector machines, regression, and/or a neural network. The neural network may be any of a myriad of type of neural networks including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting— regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially.

In one example, FIG. 6 depicts nodes that may perform various types of processing, such as discrete computations, computer programs, and/or mathematical functions implemented by a computing device. For example, the input nodes 610a-n may comprise logical inputs of different data sources, such as one or more data servers. The processing nodes 620a-n may comprise parallel processes executing on multiple servers in a data center. And, the output nodes 640a-n may be the logical outputs that ultimately are stored in results data stores, such as the same or different data servers as for the input nodes 610a-n. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 600 may learn and/or be dynamically reconfigured. Though nodes are depicted as having connections only to successive nodes in FIG. 6, connections may be formed between any nodes. For example, one processing node may be configured to send output to a previous processing node.

Input received in the input nodes 610a-n may be processed through processing nodes, such as the first set of processing nodes 620a-n and the second set of processing nodes 630a-n. The processing may result in output in output nodes 640a-n. As depicted by the connections from the first set of processing nodes 620a-n and the second set of processing nodes 630a-n, processing may comprise multiple steps or sequences. For example, the first set of processing nodes 620a-n may be a rough data filter, whereas the second set of processing nodes 630a-n may be a more detailed data filter.

The artificial neural network 600 may be configured to effectuate decision-making. As a simplified example for the purposes of explanation, the artificial neural network 600 may be configured to detect faces in photographs. The input nodes 610a-n may be provided with a digital copy of a photograph. The first set of processing nodes 620a-n may be each configured to perform specific steps to remove non-facial content, such as large contiguous sections of the color red. The second set of processing nodes 630a-n may be each configured to look for rough approximations of faces, such as facial shapes and skin tones. Multiple subsequent sets may further refine this processing, each looking for further more specific tasks, with each node performing some form of processing which need not necessarily operate in the furtherance of that task. The artificial neural network 600 may then predict the location on the face. The prediction may be correct or incorrect.

The feedback system 650 may be configured to determine whether or not the artificial neural network 600 made a correct decision. Feedback may comprise an indication of a correct answer and/or an indication of an incorrect answer and/or a degree of correctness (e.g., a percentage). For example, in the facial recognition example provided above, the feedback system 650 may be configured to determine if the face was correctly identified and, if so, what percentage of the face was correctly identified. The feedback system 650 may already know a correct answer, such that the feedback system may train the artificial neural network 600 by indicating whether it made a correct decision. The feedback system 650 may comprise human input, such as an administrator telling the artificial neural network 600 whether it made a correct decision. The feedback system may provide feedback (e.g., an indication of whether the previous output was correct or incorrect) to the artificial neural network 600 via input nodes 610a-n or may transmit such information to one or more nodes. The feedback system 650 may additionally or alternatively be coupled to the storage 670 such that output is stored. The feedback system may not have correct answers at all, but instead base feedback on further processing: for example, the feedback system may comprise a system programmed to identify faces, such that the feedback allows the artificial neural network 600 to compare its results to that of a manually programmed system.

The artificial neural network 600 may be dynamically modified to learn and provide better input. Based on, for example, previous input and output and feedback from the feedback system 650, the artificial neural network 600 may modify itself. For example, processing in nodes may change and/or connections may be weighted differently. Following on the example provided previously, the facial prediction may have been incorrect because the photos provided to the algorithm were tinted in a manner which made all faces look red. As such, the node which excluded sections of photos containing large contiguous sections of the color red could be considered unreliable, and the connections to that node may be weighted significantly less. Additionally or alternatively, the node may be reconfigured to process photos differently. The modifications may be predictions and/or guesses by the artificial neural network 600, such that the artificial neural network 600 may vary its nodes and connections to test hypotheses.

The artificial neural network 600 need not have a set number of processing nodes or number of sets of processing nodes, but may increase or decrease its complexity. For example, the artificial neural network 600 may determine that one or more processing nodes are unnecessary or should be repurposed, and either discard or reconfigure the processing nodes on that basis. As another example, the artificial neural network 600 may determine that further processing of all or part of the input is required and add additional processing nodes and/or sets of processing nodes on that basis.

The feedback provided by the feedback system 650 may be mere reinforcement (e.g., providing an indication that output is correct or incorrect, awarding the machine learning algorithm a number of points, or the like) or may be specific (e.g., providing the correct output). For example, the machine learning algorithm 600 may be asked to detect faces in photographs. Based on an output, the feedback system 650 may indicate a score (e.g., 75% accuracy, an indication that the guess was accurate, or the like) or a specific response (e.g., specifically identifying where the face was located).

The artificial neural network 600 may be supported or replaced by other forms of machine learning. For example, one or more of the nodes of artificial neural network 600 may implement a decision tree, associational rule set, logic programming, regression model, cluster analysis mechanisms, Bayesian network, propositional formulae, generative models, and/or other algorithms or forms of decision-making. The artificial neural network 600 may effectuate deep learning.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system for pre-compilation and executing of test scripts, the system comprising:
a user computing device configured to submit, via a source code collaboration system and to a test automation platform:
a test script associated with an application, wherein the test script comprises an ordered sequence of a plurality of steps for testing the application, and
input test data associated with the plurality of steps; and
the test automation platform communicatively to the user computing device, the test automation platform comprising:
at least one processor; and
memory storing computer-readable instructions that, when executed by the at least one processor, cause the test automation platform to:
receive, from the user computing device, the test script and the input test data;
prior to compiling the test script:
evaluate, using a natural language processing (NLP)-based evaluation module, the plurality of steps associated with the test script;
determine, based on one or more rules, that a first portion and a second portion of the input test data comprises sensitive information; and
based on the determining that the first portion and the second portion of the input test data comprises sensitive information,
encrypting the first portion of the input test data, and
mocking the second portion of the input test data, wherein
the mocking comprises replacing the second portion of the input test data with mock data;
add, based on successful evaluation of the test script, the test script and modified input test data to a source code repository, wherein the modified input test data comprises the encrypted first portion of the input test data, and the mocked second portion of the input test data;
compile the test script in the source code repository;
execute, based on a trigger and for testing the application, the test script, wherein the modified input test data is used as an input for the application; and
send, based on the execution of the test script, a test report, wherein the test report is based on a comparison between:
expected outcomes based on the execution of the test script, and
determined outcomes based on execution of the test script.

2. The system of claim 1, wherein the evaluating the test script comprises:
predicting, using the NLP-based evaluation module and based on one or more previous steps of the test script, a predicted next step of the test script;
comparing the predicted next step of the test script with a step, of the test script, following the one or more previous steps; and
determining whether the predicted next step of the test script is the same as the step following the one or more previous steps.

3. The system of claim 2, wherein the successful evaluation of the test script comprises determining that predicted steps of the test script are the same as the plurality of steps of the test script.

4. The system of claim 1, wherein the trigger comprises determining that an update has been made to the application.

5. The system of claim 1, wherein the determining that the first portion and the second portion of the input test data comprises sensitive information is based on field names associated with the first portion and the second portion of the input test data.

6. The system of claim 1, wherein a step of the plurality of steps indicates a test input for the application, and wherein executing the test script comprises applying the test input to the application to generate an outcome for the test input.

7. The system of claim 6, wherein another step of the plurality of steps indicates an expected outcome for the test input, and wherein the test report indicates a comparison of the expected outcome for the test input and the outcome for the test input.

8. The system of claim 7, wherein:
the application corresponds to a graphical user interface (GUI),
the test input is an input via the GUI, and
the expected outcome is a second GUI.

9. A method for pre-compilation and execution of test scripts in a test automation pipeline, the method comprising:
receiving, from a user computing device,
a test script associated with an application, wherein the test script comprises an ordered sequence of a plurality of steps for testing the application, and
input test data associated with the plurality of steps;

prior to compiling the test script:
evaluating, using a natural language processing (NLP)-based evaluation module, the plurality of steps associated with the test script;
determining, based on one or more rules, that at least a portion of the input test data comprises sensitive information; and
encrypting, based on the determining that the input test data comprises sensitive information, the at least the portion of the input test data to generate modified input test data;
adding, based on successful evaluation of the test script, the test script and the modified input test data to a source code repository;
compiling the test script in the source code repository;
executing, based on a trigger and for testing the application, the test script, wherein the modified input test data is used as an input for the application; and
sending, based on the execution of the test script, a test report, wherein the test report is based on a comparison between:
expected outcomes based on the execution of the test script, and
determined outcomes based on execution of the test script.

10. The method of claim 9, wherein the evaluating the plurality of steps associated with the test script comprises:
predicting, using the NLP-based evaluation module and based on one or more previous steps of the test script, a predicted next step of the test script;
comparing the predicted next step of the test script with a step, of the test script, following the one or more previous steps; and
determining whether the predicted next step of the test script is the same as the step following the one or more previous steps.

11. The method of claim 10, wherein the successful evaluation of the test script comprises determining that predicted steps of the test script are the same as the plurality of steps of the test script.

12. The method of claim 9, wherein the trigger comprises determining that an update has been made to the application.

13. The method of claim 9, wherein the determining that the at least the portion of the input test data comprises sensitive information is based on field names associated with the at least the portion of the input test data.

14. The method of claim 9, wherein a step of the plurality of steps indicates a test input for the application, and wherein executing the test script comprises applying the test input to the application to generate an outcome for the test input.

15. The method of claim 14, wherein another step of the plurality of steps indicates an expected outcome for the test input, and wherein the test report indicates a comparison of the expected outcome for the test input and the outcome for the test input.

16. The method of claim 15, wherein:
the application corresponds to a graphical user interface (GUI),
the test input is an input via the GUI, and
the expected outcome is a second GUI.

17. A method for pre-compilation and execution of test scripts in a test automation pipeline, the method comprising:
receiving, from a user computing device,
a test script associated with an application, wherein the test script comprises an ordered sequence of a plurality of steps for testing the application, and
input test data associated with the plurality of steps;
prior to compiling the test script:
evaluating, using a natural language processing (NLP)-based evaluation module, the plurality of steps associated with the test script;
determining, based on one or more rules, that at least a portion of the input test data comprises sensitive information; and
mocking, based on the determining that the input test data comprises sensitive information, the at least the portion of the input test data to generate modified input test data, wherein the mocking comprises replacing the at least the portion of the input test data with mock data;
adding, based on successful evaluation of the test script, the test script and the modified input test data to a source code repository;
compiling the test script in the source code repository;
executing, based on a trigger and for testing the application, the test script, wherein the modified input test data is used as an input for the application; and
sending, based on the execution of the test script, a test report, wherein the test report is based on a comparison between:
expected outcomes based on the execution of the test script, and
determined outcomes based on execution of the test script.

18. The method of claim 17, wherein the evaluating the plurality of steps associated with the test script comprises:
predicting, using the NLP-based evaluation module and based on one or more previous steps of the test script, a predicted next step of the test script;
comparing the predicted next step of the test script with a step, of the test script, following the one or more previous steps; and
determining whether the predicted next step of the test script is the same as the step following the one or more previous steps.

19. The method of claim 18, wherein the successful evaluation of the test script comprises determining that predicted steps of the test script are the same as the plurality of steps of the test script.

20. The method of claim 17, wherein the determining that the at least the portion of the input test data comprises sensitive information is based on field names associated with the at least the portion of the input test data.

* * * * *